March 10, 1970 KOICHI TAKEUCHI ET AL 3,500,346

DRIVING PLATES FOR MAGNETIC FILMS

Filed Aug. 13, 1964

Koichi Takeuchi
Asao Shikama
Shozo Takano
INVENTORS

BY George B. Oujevolk
Attorney

United States Patent Office 3,500,346

Patented Mar. 10, 1970

3,500,346
DRIVING PLATES FOR MAGNETIC FILMS

Koichi Takeuchi, Tokyo, Asao Shikama, Kawasaki-shi, and Shozo Takeno, Yokohama-shi, Japan, assignors to Tokyo Shibaura Electric Co., Ltd., Yokohama-shi, Japan, a corporation of Japan Filed Aug. 13, 1964, Ser. No. 389,441
Claims priority, application Japan, Aug. 14, 1963, 38/61,105
Int. Cl. G11b *5/00;* H02b *1/04, 9/00*
U.S. Cl. 340—174 3 Claims

ABSTRACT OF THE DISCLOSURE

A driving plate for magnetic films comprising a base plate having a plurality of aligned driving wires extending longitudinally across but the outer ends of said driving wires not extending up to the edges of said base plate, said aligned driving wires being disposed on the opposites of said base plate, said aligned driving wires on the one of said surfaces being perpendicular to those on the other surface, a lamina upon said base plate, output terminals on said lamina extending inwards only to the respective ends of said driving wires, perforations through the outer ends of said driving wires and through the inner ends of the output terminals of said laminated plates, and film conductors on the inner walls of said perforations so as to interconnect said driving wires and output terminals.

This invention relates to driving plates for magnetic films and more particularly to improvements in printed wire type driving plates adapted to magnetically drive magnetic films by means of electric current.

The prior art driving plate for magnetic films comprises a base plate or substrate having a coating of magnetic film deposited thereon by any suitable means such as vacuum vapor deposition, electroplating or the like technique and a printed sheet or board bonded to said base plate having driving wires disposed to be superposed upon said printed plate.

For example, such a driving plate for magnetic films can be prepared by applying copper foils on the opposite surfaces of an epoxy glass lamination having a thickness of about 0.3 mm. and then printing and etching the foils so as to retain only the wire portions adapted to carry driving current. Alternatively, a thin Mylar film of the thickness of about 0.03 mm. may be used as the printed sheet, it being to be understood that methods of printing and etching are the same as those above described. Even with such a driving plate in the form of a thin film, if the base plate for the magnetic film has sufficient thickness there would arise no trouble of mechanical strength since the driving plate is supported by the base plate. However, where the base plate for supporting the magnetic film is made of a very thin sheet such as a glass cloth there will be defects such that the plate will be ruptured, and be deformed to create a mechanical strain in the magnetic material applied on the surface of the base plate thus deteriorating the magnetizing property thereof. Thus, the base plate is required to be reinforced by taking into consideration the above described factors. While such a reinforcement can improve the mechanical strength, it will also increase the thickness of the base plate, thereby increasing the spacing between driving wires printed on the opposite surfaces of said base plate and the magnetic films so that there is a practical limit for the reinforcement. Further, even with a thin base plate for magnetic films, the mechanical strength thereof could be increased by increasing the thickness of the base plate adapted to be printed with driving wires and bonded to said base plate. Actually this thickness is dependent upon the influence of the driving field due to the driving current flowing through the driving wires upon the magnetic film. More particularly, with a thick printed base plate it is impossible to increase the density of bits, thus making it difficult to fulfill the requirements for economy and miniaturization.

Accordingly, it is an object of this invention to provide a novel driving plate for magnetic films which enables the use of a flexible and extremely thin film as the printed base plate whereby bringing conductors of both coordinates closer to magnetic films as far as possible.

Another object of this invention is to provide an improved driving plate having good current viz magnetic field efficiency.

Still another object of this invention is to provide a novel driving plate having a high bit density.

Yet another object of this invention is to provide a driving plate for magnetic films comprising laminated epoxy glass sheets which are bonded together to increase mechanical strength and flatness.

A further object of this invention is to provide an improved driving plate for magnetic films which enables the adapation of plug-in system by bringing the lead wires to the outer surface of the epoxy glass lamination through the use of a through hole technique.

Further objects and advantages of the present invention will become apparent and this invention will be better understood from the following description, reference being had to the accompanying drawings. The features of the novelty which characterize the invention are set forth in the appended claims annexed to and forming part of this specification.

Figures 1, 2, 3:
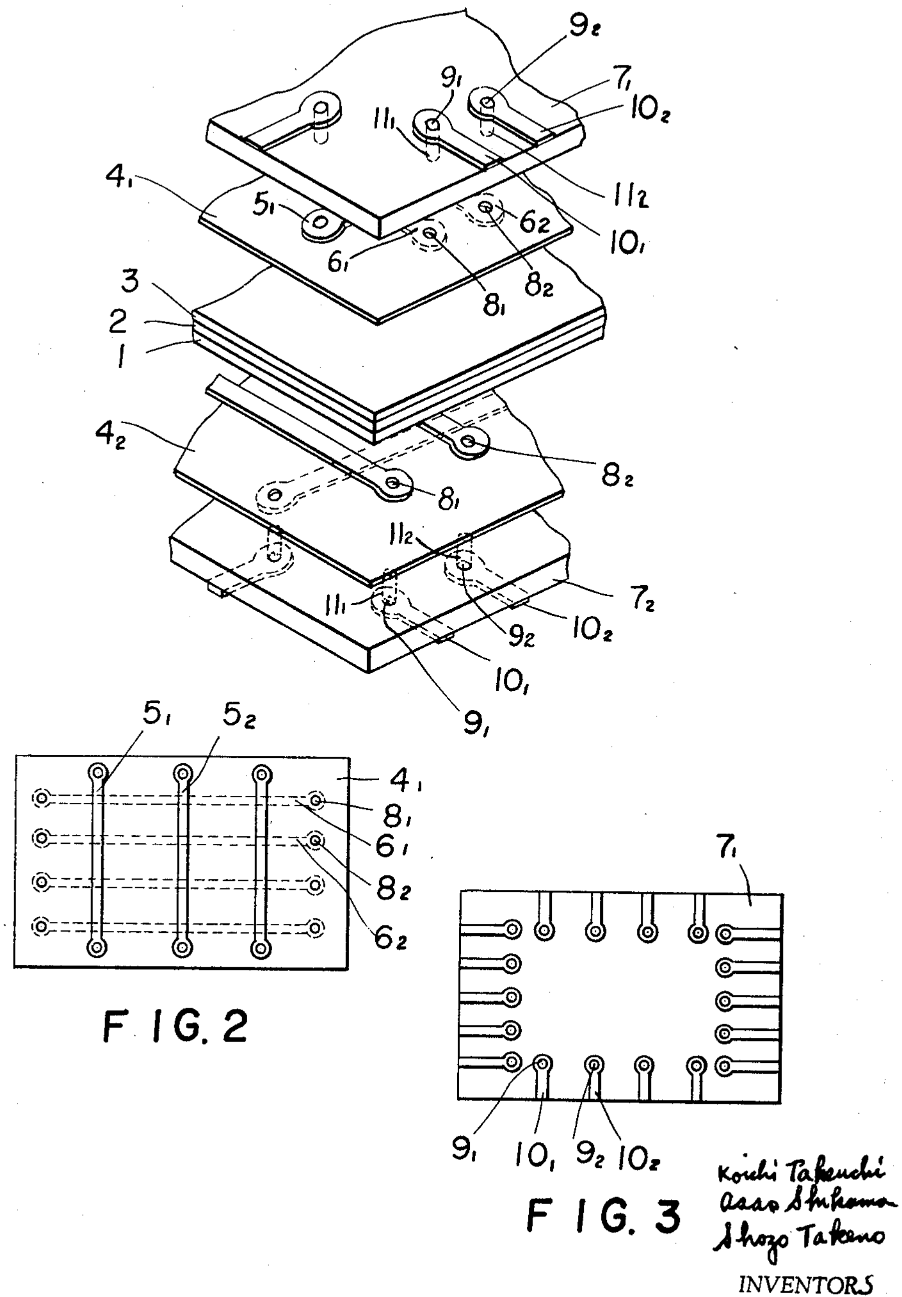
FIG. 1 shows an exploded perspective view to explain the construction of a driving plate embodying this invention.
FIG. 2 shows a plan view of a base plate printed on both sides thereof and to be utilized in this invention.
FIG. 3 is a plan view of a laminated plate to be utilized in this invention.

Referring now to FIG. 1 of the accompanying drawing a magnetic film 2 is deposited on one surface of an insulating and magnetic thin base plate or sheet 1 by any suitable means such as vapor deposition and the like. Further an insulating film 3 composed of silicon monooxide, for example, is deposited on the magnetic film 2 by similar process. Printing base plates $4_1$ and $4_2$ composed of films of polyethyleneterephthalate, for example, sold under the trade name of Mylar are placed on the upper surface of said insulator film 3 and on the lower surface of said magnetic film base plate 1. On the front surface of the base plate $4_1$ are bonded driving wires $5_1$, $5_2$ and so on, which are arranged in parallel relation, while on the rear surface driving wires $6_1$, $6_2$ and so on are arranged perpendicular to the driving wires $5_1$, $5_2$ and so on. Further on the upper and lower surfaces, respectively, of the base plates $4_1$ and $4_2$ are bonded epoxy glass laminated sheets $7_1$ and $7_2$ with their copper plated surfaces outside. These laminated sheets $7_1$ and $7_2$ can be prepared, for instance, by laminating glass cloth impregnated with epoxy resin, laying foils of electrolytic copper on the surface thereof and then heating under pressure. As shown in the drawing perforations $8_1$, $8_2$ . . . and $9_1$, $9_2$ . . . are perforated through the laminated sheets $7_1$ and $7_2$ at the respective ends of drive wires $5_1$, $5_2$ . . . and $6_1$, $6_2$ of the base plates $4_1$ and $4_2$. As shown in FIG. 3, a plurality of aligned terminals $10_1$, $10_2$ . . . are provided around the periphery of the laminated sheet $7_1$ by printing on the copper plated surface thereof and then subjecting it to etching treatment. Film conductors $11_1$, $11_2$ . . . are formed by electroless plating and the like process on the inner walls of perforations $8_1$, $8_2$ . . . and $9_1$, $9_2$ . . . which are respectively perforated through the respective ends of the driving wires $5_1$, $5_2$ . . . and $6_1$ and $6_2$ and through the output terminals $10_1$ and $10_2$ of said laminated plates which are facing said ends so as to connect the driving wires $5_1$, $5_2$ . . . and $6_1$, $6_2$ of the base plates $4_1$ and $4_2$ having printed wires on the opposite surfaces thereof and the output terminals of the epoxy glass laminated plates $7_1$ and $7_2$.

Driving plates for magnetic films constructed as above described have the following merit when compared with the prior art driving plates. Thus, for example if the laminated plates were made of a hard substance such as epoxy glass and the like, output terminals from the printed base plates can be utilized to receive plug type connectors.

Further, it is possible to reduce the spacing between the driving wires on the base plate with printing on both sides and the magnetic films which are laminated after completing connections thereby providing memory devices of high speed and large capacity with increased bit density. Moreover, the uniformity of the gap between driving wires and the magnetic film is improved thereby decreasing noise and providing simultaneous reversal of magnetization.

Although a specific embodiment has been disclosed to illustrate the invention, it will be evident that the invention can be modified in various ways without departing from the scope of the invention as defined in the appended claims.

What is claimed is:

1. A driving plate and magnetic film assembly comprising in combination, a base plate having a plurality of aligned driving wires extending longitudinally across but the outer ends of said driving wires not extending up to the edges of said base plate, said aligned driving wires being disposed on opposite sides of said base plate, said aligned driving wires on the one of said surfaces being perpendicular to those on the other surface, a lamina upon said base plate provided with a plurality of output terminals on said lamina extending inwards only to the respective ends of said driving wires and through the inner ends of the output terminals of said laminated plates, film conductors on the inner walls of said perforations so as to interconnect said driving wires and output terminals, and, a magnetic thin film sheet with insulating layers on both sides disposed over said base plate.

2. A magnetic film memory device comprising a lamina of magnetic material disposed between insulating layers and having applied to each side thereof a second insulating member carrying on its two sides respective perpendicularly disposed arrays of spaced parallel conductors and a first insulating member disposed on said second insulating member and provided with terminals electrically connected to conductors in both said arrays, said second insulating member being disposed adjacent said insulated magnetic lamina.

3. A magnetic film memory device comprising a stacked assembly, in the order stated, of a first planar insulating member carrying a plurality of terminals, a second planar insulating member carrying on its two sides respective perpendicularly disposed sets of spaced parallel conductors electrically connected with said terminals, a planar magnetic film enclosed between insulating layers, a third planar insulating member carrying on its two sides respective perpendicularly disposed sets of spaced parallel conductors, and a fourth planar insulating member carrying a plurality of terminals electrically connected to said sets of conductors on said third member.

References Cited

UNITED STATES PATENTS

| | | | |
|---|---|---|---|
| 3,317,408 | 5/1967 | Barnes et al. | 204—15 |
| 3,202,879 | 8/1965 | Sterling | 317—101 |

FOREIGN PATENTS

| | | |
|---|---|---|
| 77,009 | 11/1961 | France. |

JAMES W. MOFFITT, Primary Examiner

U.S. Cl. X.R.

29—604, 609, 625, 628; 317—101